United States Patent
Santesson et al.

(10) Patent No.: US 9,424,217 B2
(45) Date of Patent: Aug. 23, 2016

(54) METHODS AND DEVICES FOR FINDING SETTINGS TO BE USED IN RELATION TO A SENSOR UNIT CONNECTED TO A PROCESSING UNIT

(71) Applicant: AXIS AB, Lund (SE)

(72) Inventors: Martin Santesson, Limhamn (SE); Henrik Fasth, Kristianstad (SE); Magnus Mårtensson, Bjärred (SE); Joakim Olsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/739,622

(22) Filed: Jun. 15, 2015

(65) Prior Publication Data

US 2016/0004657 A1    Jan. 7, 2016

(30) Foreign Application Priority Data

Jul. 1, 2014   (EP) ..................................... 14175169

(51) Int. Cl.
  *G06F 3/00*   (2006.01)
  *G06F 13/38*  (2006.01)
  *G06F 13/10*  (2006.01)
  *G06F 13/12*  (2006.01)

(52) U.S. Cl.
  CPC ........... *G06F 13/387* (2013.01); *G06F 13/102* (2013.01); *G06F 13/126* (2013.01)

(58) Field of Classification Search
  None
  See application file for complete search history.

(56) References Cited

U.S. PATENT DOCUMENTS

| | | |
|---|---|---|
| 5,839,094 A | 11/1998 | French |
| 7,126,629 B1 | 10/2006 | Braunstein et al. |
| 7,502,066 B1 | 3/2009 | Merrill et al. |
| 7,855,727 B2 | 12/2010 | Adler et al. |
| 8,049,789 B2 | 11/2011 | Innocent |
| 8,314,865 B2 | 11/2012 | Muukki et al. |
| 8,466,974 B2 | 6/2013 | Yu et al. |
| 8,780,225 B2 | 7/2014 | Bai et al. |
| 2003/0206231 A1 | 11/2003 | Chen et al. |
| 2004/0090534 A1 | 5/2004 | Nakami et al. |
| 2004/0239798 A1 | 12/2004 | Nayar et al. |
| 2005/0033540 A1 | 2/2005 | Bathurst et al. |
| 2008/0100704 A1 | 5/2008 | Venetianer et al. |
| 2009/0169120 A1 | 7/2009 | Otani |
| 2010/0110209 A1 | 5/2010 | Border et al. |
| 2010/0118169 A1 | 5/2010 | Yu et al. |
| 2010/0175074 A1 | 7/2010 | Kanada |
| 2010/0321506 A1 | 12/2010 | Li et al. |

(Continued)

FOREIGN PATENT DOCUMENTS

| | | |
|---|---|---|
| EP | 1048933 A1 | 11/2000 |
| JP | 2004193683 A | 7/2004 |
| WO | 03001331 A2 | 1/2003 |

*Primary Examiner* — Idriss N Alrobaye
*Assistant Examiner* — Richard B Franklin
(74) *Attorney, Agent, or Firm* — Volpe and Koenig, P.C.

(57) ABSTRACT

A method performed in a processing unit for finding settings to be used in relation to a sensor unit connected to the processing unit is disclosed. The method comprises inter alia receiving, from the sensor unit, a first identifier identifying a type of the sensor unit, and a second identifier identifying a group of at least one related type of sensor unit. If no settings associated with the first identifier are stored in the processing unit, but settings associated with the second identifier are stored in the processing unit, the processing unit uses the settings associated with the second identifier in relation to the sensor unit.

14 Claims, 5 Drawing Sheets

(56) References Cited

U.S. PATENT DOCUMENTS

| | | |
|---|---|---|
| 2011/0149116 A1 | 6/2011 | Kim |
| 2011/0187859 A1 | 8/2011 | Edelson |
| 2011/0230995 A1* | 9/2011 | Irwin .................... B29C 45/76 700/99 |
| 2011/0242370 A1 | 10/2011 | Endo |
| 2011/0302347 A1 | 12/2011 | Schubert et al. |
| 2012/0081519 A1 | 4/2012 | Goma et al. |
| 2012/0081566 A1 | 4/2012 | Côté et al. |
| 2012/0105374 A1 | 5/2012 | Chen et al. |
| 2012/0273910 A1 | 11/2012 | Hochschulz et al. |
| 2012/0274786 A1 | 11/2012 | Wang |
| 2012/0278796 A1* | 11/2012 | Sandlin ................ G06F 9/4411 717/174 |
| 2013/0012263 A1 | 1/2013 | Goto et al. |
| 2013/0182177 A1 | 7/2013 | Furlan |
| 2013/0182756 A1 | 7/2013 | Furlan |
| 2014/0036072 A1 | 2/2014 | Lyall et al. |
| 2014/0146185 A1 | 5/2014 | Kammermark et al. |

\* cited by examiner

METHODS AND DEVICES FOR FINDING SETTINGS TO BE USED IN RELATION TO A SENSOR UNIT CONNECTED TO A PROCESSING UNIT

CROSS REFERENCE TO RELATED APPLICATION

This application claims the benefit of European Patent Application No 14175169.3 filed on Jul. 1, 2014, which is incorporated by reference as if fully set forth.

FIELD OF INVENTION

The present invention relates to the field of sensor units. In particular, it relates to methods and devices for finding settings to be used in relation to a sensor unit which is connected to a processing unit.

BACKGROUND

There are systems where different types of sensor units, such as different sorts of camera heads, microphones etc., may be connected to a main unit. For example, the main unit may have a number of ports where sensor units may be connected. Typically, for space efficiency reasons, the sensor units of these kind of systems have no or minimal processing capability. Instead, the main unit possesses processing capability in order to, for instance, control the acquisition of sensor data, and process the resulting sensor data. Since the hardware and functionality of the different types of sensor units may differ, different settings are typically required for the control of the sensor units and the processing of the sensor data.

A problem which arises in such systems is how to enable a sensor unit to be connected to the main unit and start working immediately without the need for rebooting the main unit. This would for example enable a camera head of a first type to be replaced by another camera head of a second type without adding extra time for reconfiguration of the main unit.

This problem is addressed in U.S. Pat. No. 8,466,974, which discloses to store a file in the main unit with data sets, including identification data and configuration data, associated with multiple types of image sensors. As a sensor unit is connected to the main unit, an identifier of the sensor unit is compared with the identification data of the data sets, and if a match is found the main unit uses configuration data of the matching data set in relation to the sensor unit. If no match is found, the file may be updated with a new data set corresponding to the sensor unit.

As long as there is a matching data set, the method of U.S. Pat. No. 8,466,974 thus enables the sensor unit to start working immediately upon connection. However, when there is no matching data set, for instance when a new type of sensor unit has been launched after the latest firmware update of the main unit or if a firmware version including data sets for the type of new sensor unit has not yet been released, the main unit has to be updated with new data which may be a tedious procedure. There is thus a need for a method which enables immediate operation of a sensor unit although there is no corresponding data set stored in the main unit.

SUMMARY

In view of the above, it is thus an object of the present invention to mitigate the above drawbacks and provide methods and devices for finding settings to be used in relation to a sensor unit connected to a processing unit.

According to a first aspect of the invention, the above object is achieved by a method performed in a processing unit for finding settings to be used in relation to a sensor unit connected to the processing unit. The method includes receiving, from the sensor unit, a first identifier identifying a type of the sensor unit, and a second identifier identifying a group of at least one related type of sensor unit; checking if there are settings associated with the first identifier stored in the processing unit; if settings associated with the first identifier are stored in the processing unit, using the settings associated with the first identifier in relation to the sensor unit; if no settings associated with the first identifier are stored in the processing unit, checking if there are settings associated with the second identifier stored in the processing unit; and if settings associated with the second identifier are stored in the processing unit, using the settings associated with the second identifier in relation to the sensor unit.

With this arrangement, the processing unit receives not only a first identifier which identifies the type of the connected sensor unit, but also a second identifier which identifies a group of at least one related type of sensor unit. If the processing unit has not been updated to include settings for the connected sensor unit type, there are no settings stored with respect to the connected sensor unit type as identified by the first identifier. Instead, settings which are stored with respect to a related sensor unit type as identified by the second identifier are used with respect to the connected sensor unit. Typically, the related types of sensor units have similar settings as the connected sensor unit, meaning that the connected sensor unit is mapped to the sensor unit type having the closest already available settings. By using the settings of a related type or a group of related types of sensor units, the connected sensor unit may thus be taken into immediate operation without having to update the firmware of the processing unit. However, some of the capabilities of the connected sensor unit may be non-working and the resulting quality of the sensor data may be deteriorated due to differences between the type of the connected sensor unit and the type of the related sensor unit.

The first identifier may be seen as a specific identifier in that it identifies the specific type of the connected sensor unit. The second identifier may be seen as a general identifier in that it identifies a group, or family, of related sensor unit types having similar settings. The second identifier may either be an identifier of a group of sensor units, such as a family identification, or an identifier of a sensor unit type. For example, the group of related sensor unit types may be related to the connected sensor unit in that they have similar hardware, such as belonging to the same product series, or similar functionality. In the case where the sensor units are image sensor units, two sensor unit types may e.g. be related in that they share the same image sensor, and/or have the same or similar optics. Since the settings reflect the hardware and/or functionality of the sensor unit, the type of the sensor unit and the at least one related type of sensor unit may be related in that they have a subset of settings in common.

According to one example, the connected sensor unit type as identified by the first identifier may be a camera head with a wide-angle optics, and the related sensor unit type as identified by the second identifier may be a camera head which is similar to the connected camera head but without the wide-angle optics. By applying the settings associated with the related sensor unit type to the connected sensor unit type, the processing unit may control the connected sensor unit to acquire image data, and it may process the image data such that it may be viewed by a user. In other words, the connected sensor unit may immediately be put into operation. However, the processing unit may not be able to rectify the acquired image data in order to compensate for the wide-angle optics, since such rectification is not provided for by the settings applied.

By settings as used herein is meant any parameters which are related to the initialization of the sensor unit, the control of the sensor unit, and/or the processing of data from the sensor unit. The settings may include configuration data which allows configuration of the processing unit with respect to a sensor unit type.

Using the settings associated with an identifier in relation to the sensor unit may comprise using the settings associated with the identifier when initializing (i.e. setting up) the sensor unit, controlling the sensor unit, processing data from the sensor unit, or when performing any other operation relating to the sensor unit. In other words, using the settings associated with an identifier in relation to the sensor unit implies that the processing unit is configured with respect to the sensor unit type identified by the identifier.

As mentioned above, some of the capabilities of the connected sensor unit may be non-working and the resulting quality of the sensor data may be deteriorated in case the settings associated with the second identifier are used in relation to the sensor unit. In order to inform a user about these facts, the method may further comprise providing a user notification if the settings associated with the second identifier are used in relation to the sensor unit. By way of example, the notification may be presented on a user interface of the processing unit, or may be sent as a message.

Different types of sensor units may have different levels of compatibility. The level of compatibility may be based on the similarity between the settings associated with the different types of sensor units. Two types of sensor units that have identical settings are fully compatible. Two types of sensor units that share a subset of the settings are partly compatible, and the level of compatibility depends on the overlap between the settings. According to one example, a first sensor unit type may correspond to a camera head having a vandal safe casing, and a second sensor unit type may correspond to the same camera head but without the vandal safe casing. From the perspective of initialization, control, and image processing, these two camera heads are equivalent and therefore fully compatible. According to another example, a first sensor unit type may correspond to a camera head having a wide-angle optics, and a second sensor unit type may correspond to the same camera head but without the wide-angle optics. As explained above, the settings of these two sensor unit types are not fully compatible. In order to deal with the different levels of compatibility, the method may further comprise receiving, from the sensor unit, compatibility data reflecting the compatibility of the settings associated with the second identifier in relation to the settings associated with the first identifier.

The compatibility data may comprise a compatibility score which reflects the compatibility of the settings associated with the second identifier in relation to the settings associated with the first identifier. By way of example, the compatibility score may be provided as a percentage or a number within a certain range.

The processing unit may decide whether or not to provide a user notification on basis of the compatibility score. More specifically, the user notification may be provided on a condition that the compatibility score of the settings associated with the second identifier in relation to the settings associated with the first identifier is below a particular level. In this way, the processing unit provides a user notification in case there is a poor compatibility, such as in the example with the wide-angle optics, thereby providing the user with a warning that the functionality of the sensor unit may be limited, and that the quality of the processed sensor data may be reduced. In situations where there is a high compatibility, such as in the example with the vandal safe camera head, there is no reason to warn the user and consequently no user notification is provided.

As explained above, different sensor unit types may have different functionalities and/or hardware as reflected by the associated settings. Some of the settings of two sensor unit types may thus be compatible, while other settings are non-compatible. The compatibility data may further reflect the compatibility between the settings of two sensor unit types. In more detail, the compatibility data may further reflect settings associated with the first identifier that are non-compatible (and/or compatible) with the settings associated with the second identifier. In the above example, where the connected sensor unit has a wide-angle optics and the related sensor type identified by the second identifier has not, the compatibility data may indicate that the wide-angle settings are non-compatible.

The non-compatible settings may be communicated to a user via the user notification. More precisely, the user notification may comprise an indication of settings associated with the first identifier that are non-compatible with the settings associated with the second identifier. Based on such a user notification, a user is made aware of which functionalities presently are non-working due to non-compatible settings. Based on that information a user may manually make settings with respect to the non-compatible parts in order to improve the performance of the sensor unit. In the example given above, a user may for example manually make settings regarding rectification of a wide-angle image.

The above method may be extended to not only cover a first and a second identifier, but to a hierarchy of identifiers. In more detail, the step of receiving may comprise receiving, from the sensor unit, a hierarchy of identifiers, wherein a first level of the hierarchy comprises the first identifier, a higher level in the hierarchy comprises the second identifier, and each level above the first level comprises an identifier identifying a group of at least one related type of sensor unit. The method may further include: if there are no settings associated with an identifier of each of the levels up to and including a particular level in the hierarchy stored in the processing unit, checking if there are settings associated with an identifier of the level in the hierarchy subsequent to the particular level, if settings associated with an identifier of the level in the hierarchy subsequent to the particular level are stored in the processing unit, using the settings associated with the identifier of the level in the hierarchy subsequent to the particular level in relation to the sensor unit.

Thus, the processing unit may search for stored settings with respect to the received identifiers in a level-by-level manner. The hierarchical structure allows for giving different importance, or order of preference, to different sensor unit types or groups of sensor unit types, such that the settings of one related sensor unit type are preferred in relation to the settings of another related sensor unit type if available.

The hierarchical structure may take different forms. In some embodiments, there is only one identifier per level in the hierarchy, while in other embodiments there may be a plurality of identifiers in some levels in the hierarchy. In more detail, the level in the hierarchy subsequent to the particular level may comprise a plurality of identifiers, and the step of checking if there are settings associated with an identifier of the level in the hierarchy subsequent to the particular level may include: checking if there are settings associated with each of the plurality of identifiers stored in the processing unit; and if settings associated with more than one of the plurality of identifiers are stored in the processing unit, using the stored settings associated with one of the plurality of identifiers in relation to the sensor unit. In this way, the method allows for tree-shaped hierarchical structures where several sensor unit types are given the same importance.

If settings associated with more than one of the plurality of identifiers are stored in the processing unit, the settings to be used in relation to the sensor unit may be selected on basis of the compatibility score. More precisely, the stored settings having the highest compatibility score may be used in relation to the sensor unit. In this way, the settings that presumably give the best performance of the image sensor unit and the resulting sensor data may be chosen.

According to a second aspect of the invention, the above object is achieved by a processing unit for finding settings to be used in relation to a sensor unit connected to the processing unit. The processing unit includes: a memory configured to store identifiers identifying different sensor types or different groups of sensor types, and settings associated with the identifiers; a processor configured to: receive from the sensor unit, a first identifier identifying a type of the sensor unit connected to the processing unit, and a second identifier identifying a group of at least one related type of sensor unit; check if there are settings associated with the first identifier stored in the memory of the processing unit; if settings associated with the first identifier are stored in the memory of the processing unit, use the settings associated with the first identifier in relation to the sensor unit connected to the processing unit; if no settings associated with the first identifier are stored in the memory of the processing unit, check if there are settings associated with the second identifier stored in the memory of the processing unit; and if settings associated with the second identifier are stored in the memory of the processing unit, use the settings associated with the second identifier in relation to the sensor unit connected to the processing unit.

According to a third aspect of the invention, the above object is achieved by a system for finding settings to be used in relation to a sensor unit connected to a processing unit, including: a sensor unit comprising a memory configured to store a first identifier identifying a type of the sensor unit, and a second identifier identifying a group of at least one related type of sensor unit; and a processing unit according to the second aspect to which the sensor unit is connected. The sensor unit may be an image sensor unit comprising an image sensor and a lens.

According to a fourth aspect of the invention, the above objective is achieved by a computer-program product comprising a (non-transitory) computer-readable medium with instructions adapted to carry out the method of the first aspect when executed by a device having processing capability.

The second, third, and fourth aspect may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE PREFERRED EMBODIMENTS

The present invention will now be described more fully hereinafter with reference to the accompanying drawings, in which embodiments of the invention are shown.

Figure 1:
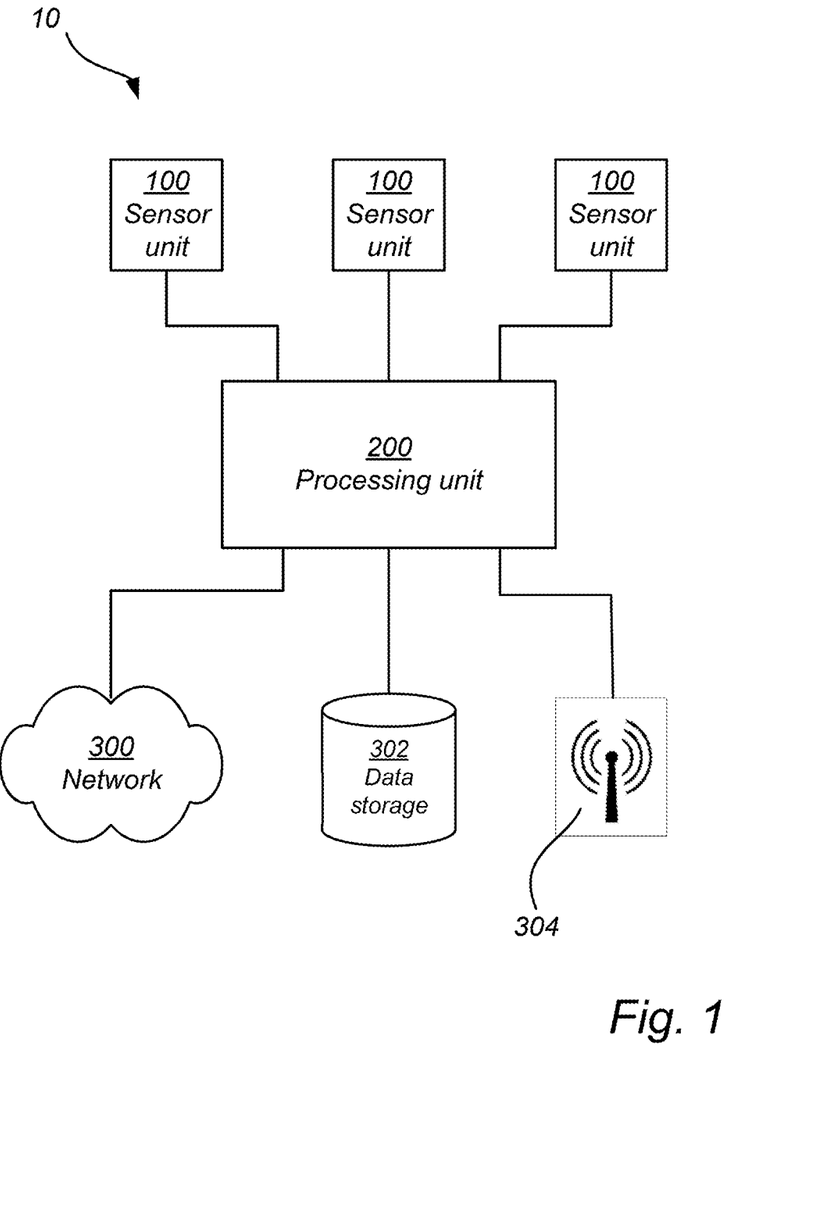
FIG. 1 schematically illustrates a system comprising a processing unit and one or more sensor units according to embodiments.

FIG. 1 illustrates a sensor system 10. The sensor system 10 may be any type of sensor system 10, for example an audio monitoring system or a monitoring system capturing motion video images. The system includes one or more sensor units 100, a processing unit 200, and data delivery channels 300, 302, 304.

The sensor units 100 may generally be any type of sensor units including various sorts of image sensor units (cameras), microphones, accelerometers, gyroscopes, magnetometers. Examples of image sensor units include thermal image sensors including for example bolometers, and image sensor units adapted for Time-of-Flight technology or other types of sensors for imaging the depth from the image sensor to the scene, such as ultrasonic sensors or image sensors using structured light technology or LIDAR (Light Detection And Ranging). The sensor units 100 are typically small in size, (e.g. having a dimension of a few centimeters), thereby allowing them to be installed in places with limited space. The sensor units 100 may also be called "thin sensors", referring to thin client concepts in that the sensor units 100 may be seen as devices which depend heavily on another more powerful device, e.g. the processing unit 200, to fulfill their traditional role of sensing physical quantities of the environment. This stands in contrast to traditional sensors in which the sensors perform all processing up to output of a completely processed data, for example a completely viewable and shareable motion video.

The sensor units 100 may be connected to the processing unit 200 via one or more ports. When more than one sensor unit 100 is connected, the processing unit 200, which typically only has a single processor, may apply a serial approach when processing data from the sensor units 100. For example, data frames of raw data from the sensor units 100 may be buffered in a buffer of the processing unit 200 according to a first in first out principle. The processor of the processing unit 200 processes the data frames from the buffer one at a time in the order they were received at the buffer. Each data frame may have associated metadata which e.g. may identify the sensor unit 100 the data frame originates from. Based on the metadata information, the processor may apply settings corresponding to the appropriate sensor unit 100 when processing data from that sensor unit 100. In other words, the processor may be configured with respect to the sensor unit 100 which it currently processes data from. The processing may for example include setting different kinds of filters, (in accordance with the settings), in the processor such that appropriate filtering of the raw data in the data frames is carried out. How to find the appropriate settings with respect to a particular sensor unit 100 is described in more detail below.

The data delivery channel may be any one of, or any combination of, a computer network 300, e.g. a WAN, a LAN, the Internet, etc., a storage device 302, e.g. a storage server, a data base, an external hard drive, etc., and a radio connection 304, e.g. a wireless LAN, mobile phone network, etc.

Figure 2:
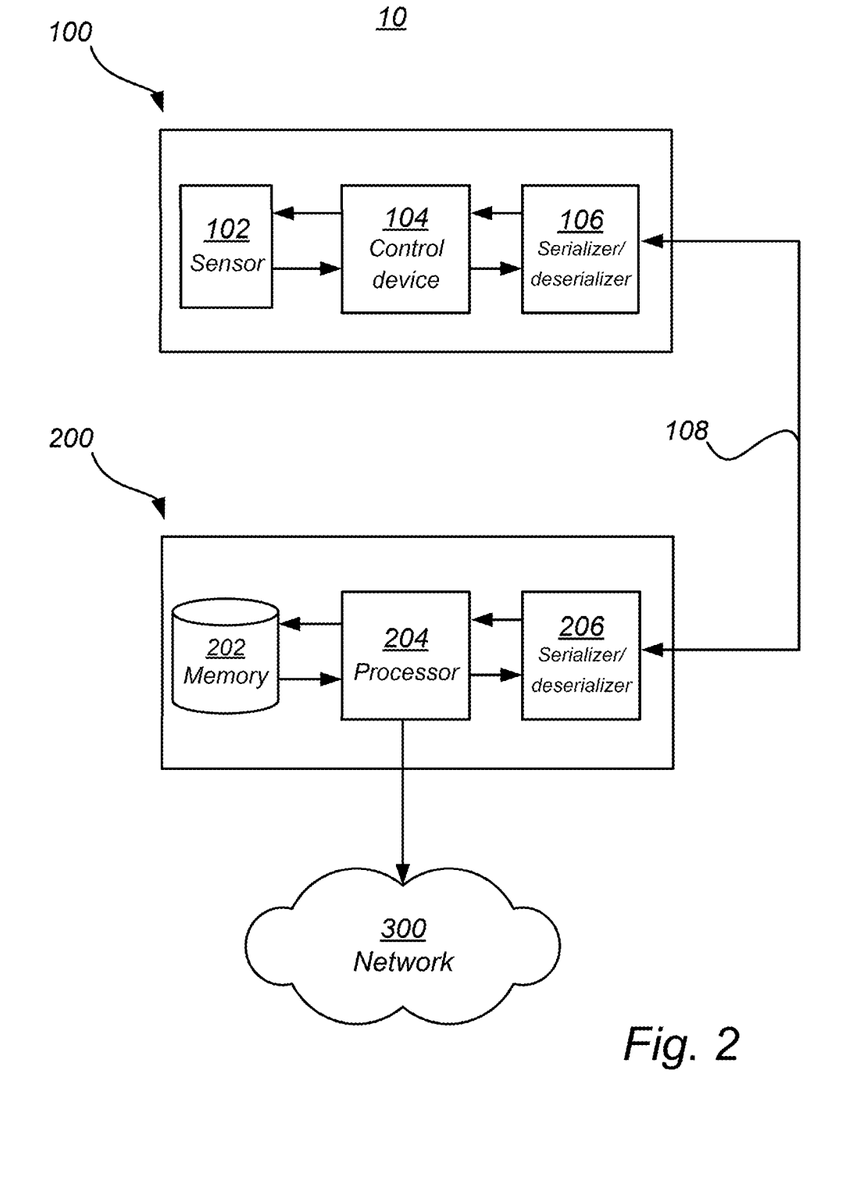
FIG. 2 schematically illustrates internal components of a processing unit and a sensor unit connected to the processing unit according to embodiments.

FIG. 2 illustrates a sensor unit 100 and a processing unit 200 in more detail. The sensor unit 100 and the processing unit 200 are typically provided as separate units or modules. A connection 108 between the sensor unit 100 and the processing unit 200 may according to some embodiments be an external link, for example a twisted pair cable, extending several meters. This is advantageous in case the sensor unit 100 needs to be positioned far from the processing unit 200. In other embodiments, the sensor unit 100 and the processing unit 200 are separate modules or separate units which are enclosed by a common housing or are mounted in a common support structure. The distance between the two units 100, 200 may be small, e.g. measured in centimeters instead of in meters. The connection 108 described above is only an example, in other embodiments the connection 108 comprise one link for sending data from the processing unit 200 to the sensor unit 100 and another link for sending data in the other direction. The connection 108 may also be used by the processing unit 200 to power the sensor unit 100.

The illustrated sensor unit 100 comprises a sensor 102, a control device 104, and a serializer/deserializer 106. The control device 104 is configured to control the sensor 102, and to packet the raw sensor data for transmittal to the processing unit 200. The control device 104 in the sensor unit 100 may be implemented using a programmable logic device (PLD) which in addition to acting as a control device may act as a non-volatile memory. The PLD is thus a combination of a logic device and a memory device. It is to be noted that in other embodiments the logic device and the memory device may be provided as separate components. The memory device comprises a memory which may be configured to store identification data including at least a first identifier identifying the type of the sensor unit 100 and a second identifier identifying a group of at least one related type of image sensor unit. The identifiers may be in the form of numbers which are coded in a bit sequence. The memory device may further be configured to store compatibility data reflecting the compatibility of settings associated with the second identifier in relation to settings associated with the first identifier.

The logic device of the control device 104 may, for example upon request from the processing device 200 via the link 108, transmit the identifiers stored in the memory of the control device 104 to the processing unit 200 via the link 108. The logic device of the control device 104 may further, for example upon request from the processing unit 200 via the link 108, transmit the compatibility data stored in the memory to the processing device 200 via the link 108.

The serializer/deserializer 106 is provided such that the sensor unit 100 can be connected to the processing unit 200 via a serial protocol.

The processing unit 200 comprises a memory 202, a processing unit 204, and a serializer/deserializer 206 corresponding to the serializer/deserializer 106 of the sensor unit 100.

The memory 202, which typically is of a non-volatile type, stores settings with respect to different types or groups of types of sensor units 100. The settings corresponding to a type or a group of types of sensor units 100 are associated with an identifier which identifies the type or the group of types of sensor units. The memory 202 stores settings with respect to a limited number of types or groups of sensor unit types. Therefore it may happen that the memory 202 does not store settings with respect to the type of sensor unit 100 which currently is connected to the processing unit 200. In particular, this may happen when a new sensor unit is released and/or when the firmware of the processing unit has not been updated to the latest version.

In case of the sensor unit 100 being an image sensor unit, comprising an image sensor and a lens, the settings could for example be settings for controlling the exposure time, white balance, iris etc., but also various image processing settings, for instance if and how barrel correction should be applied, the application of different filters, and so on. As the sensor units 100 could be fundamentally different, such as a visual light image sensor and a thermal sensor, these settings are vital for the operation of the sensor units 100.

The operation of the system 10, and in particular a method for finding settings to be used in relation to a sensor unit 100 connected to the processing unit 200, will now be described in more detail with reference to FIGS. 1-3 and the flowchart of FIG. 5.

In step S502, the processing unit 200 receives identification data including a first and a second identifier from the sensor unit 100. The identification data may for example be sent from the sensor unit 100 to the processing unit 200 upon connection of the sensor unit 100 to the processing unit 200. Alternatively, the identification data may be sent upon request from the processing unit 200.

Figure 3:
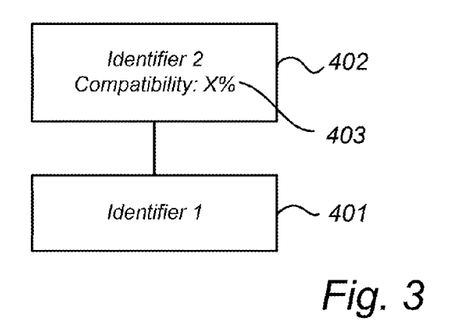
FIG. 3 illustrates a first and a second identifier according to embodiments.

FIG. 3 schematically illustrates a first identifier 401 and a second identifier 402. The first identifier 401 and second identifier 402 identifier may each be represented by a type number. The first identifier 401 identifies the type of the connected sensor unit 100, and the second identifier 402 identifies a group of at least one other (related) type of sensor unit, such as one or more sensor unit types from the same product series. The first identifier 401 and the second identifier 402 have an order of preference in that the processing unit 200 will consider the first identifier 401 before it considers the second identifier 402. The order of preference of the identifiers 401, 402 may be reflected by the order in which they are received at the processing unit 200.

In step S504, the processor 204 checks the memory 202 to see if there are any settings stored which are associated with the first identifier 401. As further explained above, the memory 202 stores settings together with associated identifiers which identify different types or group of types of sensor units 100. The processor 204 may therefore check whether the first identifier 401 matches any of the identifiers stored together with the settings in the memory 202. If settings associated with the first identifier 401 are stored in the memory 202, the method proceeds to step S510 where the processor 204 uses the settings associated with the first identifier 401 in connection to the sensor unit 100.

If the processor 204 in step S504 finds that there are no settings stored with respect to the first identifier 401, the method proceeds to step S506 where the processor 204 checks the memory 202 to see if there any settings stored which are associated with the second identifier 402. This check is performed in the same manner as explained above with reference to the first identifier. The reason for there being no stored settings stored with respect to the first identifier 401 may be that the firmware of the processing unit 200 is not updated with respect to the connected type of the sensor unit 100.

If the processor 204 in step S506 finds that there are no settings stored in the memory with respect to the second identifier 402, (and if no further identifiers are received from the sensor unit 100), the method terminates, and the sensor unit 100 cannot be operated by the processing unit 200. In such case a firmware update of the processing unit 200 may be necessary.

However, if the processor 204 in step S506 finds that there are settings stored in the memory with respect to the second identifier 402, the method proceeds to step S510 where the processor 204 uses the settings associated with the second identifier in relation to the sensor unit 100.

When settings associated with the second identifier 402 are used instead of settings associated with the first identifier 401, one cannot be sure that all functionalities of the sensor unit 100 work properly or that the sensor data is processed optimally by the processor 204. In order to inform of these potential problems, the processor 204 may in step S508 provide a user notification, for example via a graphical user interface related to the processing unit 200. For example, the graphical user interface may be provided through a webpage that a user may log on to. The user notification may be provided conditionally. In more detail, the processing unit 200 may in step S502 receive compatibility data together with the identifiers 401, 402. The compatibility data may for example be in the form of a compatibility score 403 which reflects the compatibility of the settings associated with the second identifier 402 in relation to the settings associated with the first identifier 401. If the compatibility score 403 is low, e.g. below a particular threshold, the performance of the sensor unit 100 and the quality of the processed sensor data may be expected to be deteriorated. Thus, the user notification may be sent on a condition that the compatibility score 403 of the second identifier 402 is below a particular threshold.

The user notification may further give guidance regarding non-compatible (and/or compatible) settings with respect to the settings of the second identifier in relation to the settings of the first identifier. The processing unit 204 may receive information about such non-compatible settings by means of the compatibility data. By being notified about non-compatible settings, a user may manually make settings with respect to the sensor unit 100 in order to improve the performance.

Figure 4:
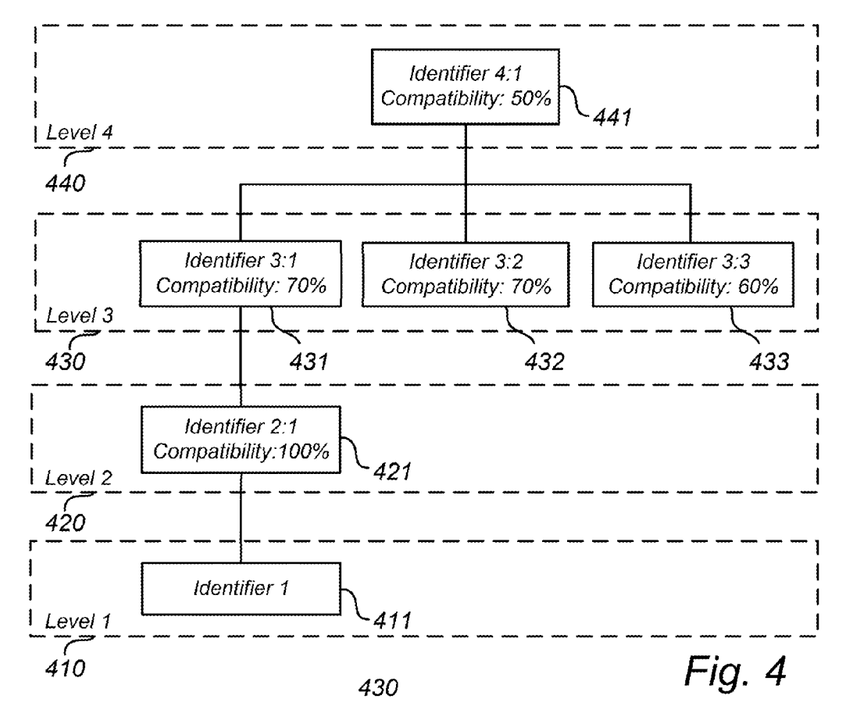
FIG. 4 illustrates a hierarchy of identifiers according to embodiments.
Figure 6:
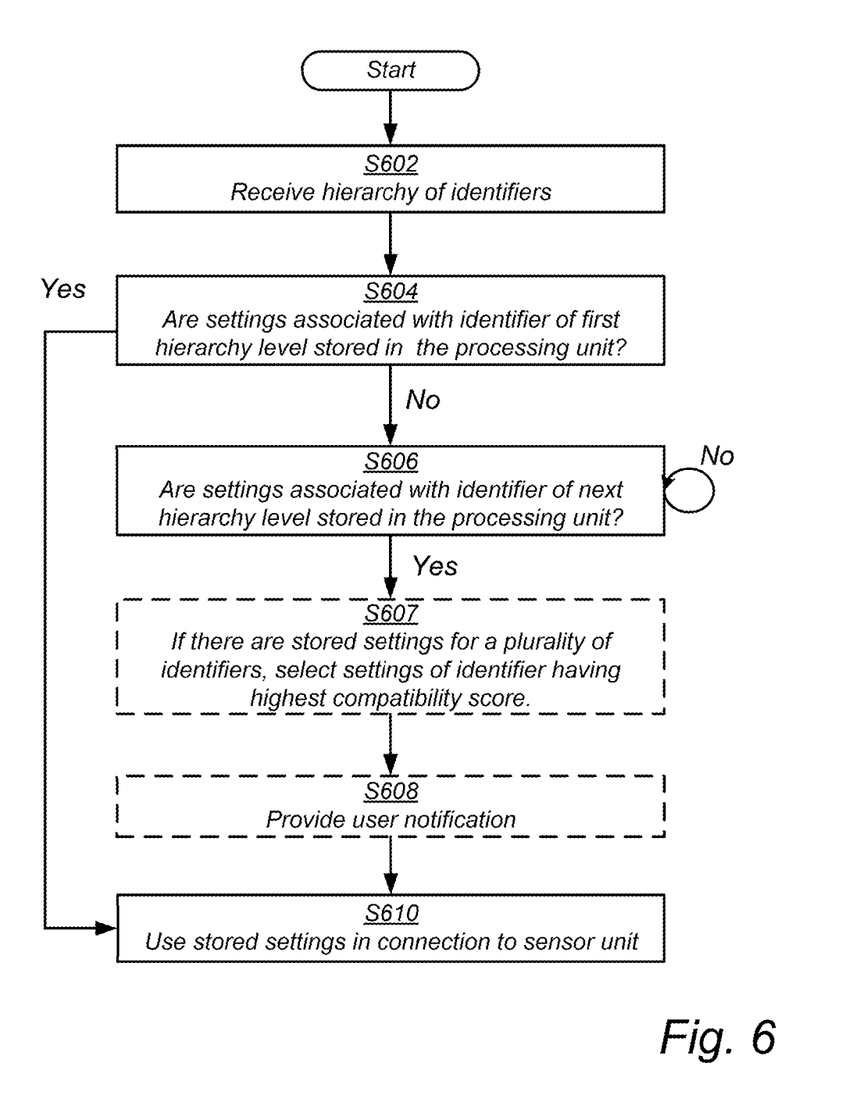
FIG. 6 is a flow chart of a method for finding settings to be used in relation to a sensor unit connected to a processing unit according to embodiments.

Another embodiment of a method for finding settings to be used in relation to a sensor unit 100 connected to the processing unit 200, will now be described in more detail with reference to FIGS. 1-2, 4 and the flowchart of FIG. 6.

In step S602, the processing unit 200 receives identification data from the sensor unit 100. The identification data may for example be sent from the sensor unit 100 to the processing unit 200 upon connection of the sensor unit 100 to the processing unit 200. Alternatively, the identification data may be sent upon request from the processing unit 200.

The identification data comprises a hierarchy of identifiers. As illustrated in FIG. 4, the hierarchy of identifiers comprises different levels, here illustrated by four levels 410, 420, 430, 440. The first level 410 comprises a first identifier 411 which identifies the type of the sensor unit 100 connected to the processing unit 200. Each subsequent level 420, 430, 440 comprises one or more identifiers. Here the second level 420 comprises one identifier 421, the third level 430 comprises three identifiers 431, 432, 433, and the fourth level 440 comprises one identifier 441. Each identifier of the second 420 and higher levels 430, 440 identifies a group of at least one type of sensor unit which is related to the type of the connected sensor unit 100. The so formed hierarchy of identifiers may have a tree-shaped structure. For example, the identifier 441 of the highest level 440 in the hierarchy may be a family identity of a product series of camera heads having the same type of image sensor. The identifiers 431, 432, 433 of the third level 430 in the hierarchy may identify different members of the product series that have different optics, i.e. different lens systems. The identifier 421 of the second level 420 may identify a sensor unit type which is a version of the sensor unit type corresponding to the identifier 431 but with an added functionality, which e.g. requires other image processing settings. The first identifier 411 may in turn identify a sensor unit type which is a version of the sensor unit type corresponding to the identifier 421 but with a vandal safe casing.

In step S604 the processor 204, similar to step S504, checks whether the memory 202 stores settings associated with the first identifier 411 of the first level in the hierarchy 410. If such settings are found, the method proceeds to step S610 where the stored settings are used in connection to the sensor unit 100. However, in case no settings are found with respect to the first identifier 411, the processor 204 continues to the next level 420 in the hierarchy. The processor 204 repeats step S606 until it has found an identifier for which there are stored settings in the memory 202, or it has reached the highest level 440 in the hierarchy without having found any stored settings.

If the processor 204, in step S606, finds that there are stored settings with respect to an identifier in the hierarchy, the method proceeds to step S610 where the processor uses the settings in relation to the sensor unit 100.

As explained above, there may be a plurality of identifiers on a level in the hierarchy, such as identifiers 431, 432, 433 on the third level 430. If the processor 204 when carrying out step S606 finds that there are settings stored in the memory 202 with respect to more than one of these identifiers, the processing unit 204 in step S607 selects the settings of one of the identifiers. For example, the memory 202 may store settings with respect to identifier 431 and identifier 433. The processor 204 may base its selection on different criteria. For example, there may be an order of preference between the identifiers 431, 432, 433, (which may be signaled from the sensor unit to the processing unit 200 in the identification data), such that the processor 204 selects the stored settings of the identifier having the highest order of preference. According to another example, the processor 204 selects the first stored settings it encounters. According to yet another example, where the identifiers of the second and higher level in the hierarchy are associated with compatibility data in the form of compatibility scores, the processor 204 selects the stored settings of the identifier having the highest compatibility score. For example, if there are stored settings with respect to identifier 431 and identifier 433, the processor 204 would select the settings of identifier 431 since identifier 431 has a higher compatibility score than identifier 433 (70% compared to 60%). If two identifiers have the same compatibility score, either of them could be selected.

Figure 5:
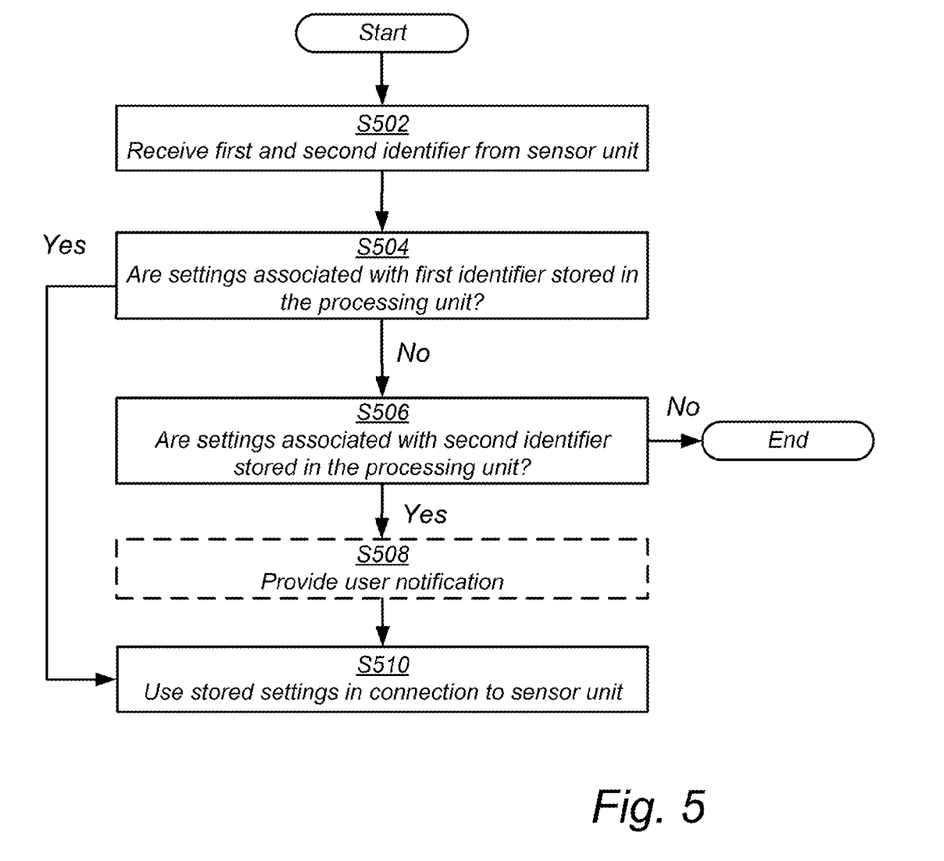
FIG. 5 is a flow chart of a method for finding settings to be used in relation to a sensor unit connected to a processing unit according to embodiments.

Similar to step S508 of FIG. 5, the method may also comprise the step S608 of providing of a user notification if settings associated with an identifier other than the first identifier 411 are used in relation to the sensor unit.

The above methods may be implemented in hardware, or software, or a combination thereof. For example, the processing unit 200 may comprise a non-transitory computer-readable medium with computer code instruction which the processor 200 can carry out in order to implement the disclosed methods.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

What is claimed is:

1. A method performed in a processing unit for finding settings to be used in relation to a sensor unit connected to the processing unit, comprising:
receiving, from the sensor unit, a first identifier identifying a type of the sensor unit, a second identifier identifying a group of at least one related type of sensor unit, and compatibility data reflecting the compatibility of settings associated with the second identifier in relation to settings associated with the first identifier;
checking if there are settings associated with the first identifier stored in the processing unit;
if settings associated with the first identifier are stored in the processing unit, using the settings associated with the first identifier in relation to the sensor unit;
if no settings associated with the first identifier are stored in the processing unit, checking if there are settings associated with the second identifier stored in the processing unit; and
if settings associated with the second identifier are stored in the processing unit, using the settings associated with the second identifier in relation to the sensor unit.

2. The method of claim 1, further comprising providing a user notification if the settings associated with the second identifier are used in relation to the sensor unit.

3. The method of claim 2, wherein the compatibility data comprises a compatibility score, and the user notification is provided on a condition that the compatibility score of the settings associated with the second identifier in relation to the settings associated with the first identifier is below a particular level.

4. The method of claim 1, wherein the compatibility data further reflects settings associated with the first identifier that are non-compatible with the settings associated with the second identifier.

5. The method of claim 4, further comprising providing a user notification if the settings associated with the second identifier are used in relation to the sensor unit, wherein the user notification comprises an indication of settings associated with the first identifier that are non-compatible with the settings associated with the second identifier.

6. The method of claim 1, wherein the step of receiving comprises receiving, from the sensor unit, a hierarchy of identifiers, wherein a first level of the hierarchy comprises the first identifier, a higher level in the hierarchy comprises the second identifier, and each level above the first level comprises an identifier identifying a group of at least one related type of sensor unit, the method further comprising:
if there are no settings associated with an identifier of each of the levels up to and including a particular level in the hierarchy stored in the processing unit, checking if there are settings associated with an identifier of the level in the hierarchy subsequent to the particular level,
if settings associated with an identifier of the level in the hierarchy subsequent to the particular level are stored in the processing unit, using the settings associated with the identifier of the level in the hierarchy subsequent to the particular level in relation to the sensor unit.

7. The method of claim 6, wherein the level in the hierarchy subsequent to the particular level comprises a plurality of identifiers, and the step of checking if there are settings associated with an identifier of the level in the hierarchy subsequent to the particular level comprises:
checking if there are settings associated with each of the plurality of identifiers stored in the processing unit, and
if settings associated with more than one of the plurality of identifiers are stored in the processing unit, using the stored settings associated with one of the plurality of identifiers in relation to the sensor unit.

8. The method of claim 7, further comprising receiving, from the sensor unit, compatibility data in the form of compatibility scores reflecting the compatibility of the settings associated with each of the plurality of identifiers in relation to the settings associated with the first identifier,
wherein the stored settings having the highest compatibility score is used in relation to the sensor unit.

9. The method of claim 1, wherein using the settings associated with an identifier in relation to the sensor unit comprises using the settings associated with the identifier when initializing the sensor unit, controlling the sensor unit or processing data from the sensor unit.

10. The method of claim 1, wherein the type of the sensor unit and the at least one related type of sensor unit are related in that they have a subset of settings in common.

11. A non-transitory computer-readable medium comprising instructions adapted to carry out the method of claim 1 when executed by a device having processing capability.

12. A processing unit for finding settings to be used in relation to a sensor unit connected to the processing unit, comprising:
a memory configured to store identifiers identifying different sensor types or different groups of sensor types, and settings associated with the identifiers;
a processor configured to:
receive from the sensor unit, a first identifier identifying a type of the sensor unit connected to the processing unit, a second identifier identifying a group of at least one related type of sensor unit, and compatibility data reflecting the compatibility of settings associated with the second identifier in relation to settings associated with the first identifier;
check if there are settings associated with the first identifier stored in the memory of the processing unit;
if settings associated with the first identifier are stored in the memory of the processing unit, use the settings associated with the first identifier in relation to the sensor unit connected to the processing unit;
if no settings associated with the first identifier are stored in the memory of the processing unit, check if there are settings associated with the second identifier stored in the memory of the processing unit; and if settings associated with the second identifier are stored in the memory of the processing unit, use the settings associated with the second identifier in relation to the sensor unit connected to the processing unit.

13. A system for finding settings to be used in relation to a sensor unit connected to a processing unit, comprising:

a sensor unit comprising a memory configured to store a first identifier identifying a type of the sensor unit, and a second identifier identifying a group of at least one related type of sensor unit; and a processing unit according to claim 11 to which the sensor unit is connected.

14. The system of claim 13, wherein the sensor unit is an image sensor unit comprising an image sensor and a lens.

* * * * *